United States Patent Office 3,081,225
Patented Mar. 12, 1963

3,081,225
ENZYME TREATMENT FOR "SCOURS" IN ANIMALS
Merle G. Farnham and John H. Nelson, Waukesha, Wis., assignors to Dairyland Food Laboratories, Inc., Waukesha, Wis., a corporation of Wisconsin
No Drawing. Filed Mar. 28, 1962, Ser. No. 183,042
6 Claims. (Cl. 167—53)

This invention relates to improvements in methods for treating the condition in young milk-fed animals such as milk-fed calves, which is commonly known as "scours," and which results in high mortality rate of such animals.

This application is a continuation-in-part of application Serial No. 31,266, filed May 24, 1960, now abandoned.

Before use of sulfa drugs and antibiotics in veterinary medicine, 3–20% of calves died before maturity and up to 60% of such calves died within two weeks after birth. (See Lovell et al. 11 Journal of Dairy Research 225.) Such medicines lose their effectiveness after a period of time, which may be too short to save the animal inasmuch as the disease is cyclic in occurrence. The disease is highly infectious and therefore dangerous to entire herds. (See Merck Veterinary Manual, 1955.) The condition is evidenced by diarrhea in which the feces are yellow to white and chalky in appearance.

Scours can occur from within 24 hours of birth to as late as age 6 months. The animals are usually affected within 10 days to 2 weeks after birth. The results of calf scours usually are loss of the desire to feed, loss of weight, and loss of energy continuing until the animal cannot stand and death occurs. The animals which recover without treatment, subsequently exhibit retarded growth and development.

The major causes of calf scours are believed to be irritation of and/or malfunctioning of the digestive system of young milk-fed animals, complicated at times by enteric bacterial infection. The condition is aggravated, if not caused, by nutritional imbalances to be expected on dairy farms. It is believed enzyme imbalances can occur which are contributing factors. Post-mortem examination of calves with scours shows that the stomach membrane through which nutrients are absorbed and the intestines are irritated and, in some cases, exceedingly inflamed. Milk curdles in the digestive system of the calf and the irritation occurring on the walls of the digestive system appears to be aggravated by relatively hard particles and lumps of milk curd which cannot be digested. A higher percentage of calves with scours is usually found in Guernsey and Jersey herds than in Holstein herds, so that the higher fat content and higher solids content of Guernsey and Jersey milk may be contributing causes in development of the scours condition.

It has been found that young milk-fed animals have secretory sites in the tongue and oral cavity (the tongue— region of the vallate papillae; the glossi-epiglottis space; and the esophagus—pharyngeal end) which produce one or more esterases having the effect of rapidly decreasing pH of the milk ingested by such animals which indicates formation of acids due to action of such esterases. The activity of the sites may vary with the age and general physical condition of the animal so that the amount of secretions and their action on milk also varies and may be insufficient to secure the decrease in pH of the milk necessary for normal digestion of the milk.

We have found that an esterase(s) system, which may be combined with milk constituents or other diluents, and may be administered with or without the addition of dietary supplements and/or antibiotics, is effective in overcoming scours in a relatively short time where used according to our method. Our composition may be administered as a medicine or may be added to the feed dependent on convenience of administration or whether treatment or prevention of the condition are desired. In animal herds where the herd records show that there has been high incidence of scours, it has been possible to greatly reduce and, in some cases, to eliminate the former high incidence of scours by using our composition as a preventive means during the first day or two in the life of the animal when the scours condition usually develops.

These esterase(s) systems may be obtained from any one of a number of animal sources such as, for example, from secretory sites located as above described (see Patent 2,531,329 to Farnham, November 21, 1950). The animal sources may be calves, kids, lambs or any other animal of which the young are available in quantity so that regular slaughtering provides a source of oral tissue in which the secretory sites are located.

Esterase(s) systems, obtained from the sources described above, as well as lipases, act to convert fats into free fatty acids and glycerides, the degree and kind of lipolysis varying with the source and type of the enzyme (assuming that the conditions of incubation are constant). We have found by chromatographic analyses that the relative amounts of free fatty acids formed by these esterases and lipases are as follows (expressed in molar precent):

Table I

|  | Butyric acid | Caproic acid | Caprylic acid | Capric acid | Lauric (and higher acid) |
|---|---|---|---|---|---|
| Calf pregastric esterase | 40.8 | 11.0 | 8.6 | 8.7 | 31.0 |
| Kid pregastric esterase | 50.0 | 18.6 | 8.4 | 7.8 | 15.3 |
| Lamb pregastric esterase | 44.8 | 17.6 | 8.3 | 7.7 | 21.8 |
| Fungal lipase (A. niger) | 10.0 | 5.3 | 4.1 | 3.6 | 77.0 |
| Pancreatic lipase | 13.5 | 8.2 | 10.2 | 8.7 | 60.0 |
| Milk lipase (cow) | 8.4 | 2.1 | trace | trace | 89.1 |
| Ave. molar percent from intact cow's milk fat | 9.4 | 3.7 | 1.5 | 3.2 | -------- |

It is generally believed that the shorter carbon chain fatty acids are more quickly and easily digested than the longer carbon chain fatty acids, it having been demonstrated that butyric acid salts can be absorbed through the stomach walls of young animals (see Flatt et al., 39 Journal of Dairy Science 928). It will be seen from the above table that the pregastric esterases extracted from the oral tissue of young milk-fed animals produce more of the shorter carbon chain fatty acids than is true of other types of lipases. We use the esterases obtained from such oral tissue because they are more effective when administered to animals.

The pregastric esterase composition is made from oral tissue as defined above and which, generally, may be defined as the edible tissues taken from between the base of the tongue and the trachea of young milk-fed animals, such as calves and kids. One method of preparing the composition is to grind the tissue until it passes through ¼ to ½ inch holes in a grinder plate. The ground tissue is thoroughly mixed with up to 15% by weight of sodium chloride to inhibit bacterial action. The mixture of tissue and salt may be held in cold storage (40–48° F.) if subsequent steps in the procedure are not to be done at once. Equal weights of the tissue-salt mixture and of nonfat dry milk (2% moisture) are mixed and/or ground to homogeneity, the milk powder being made by either the roller or spray methods. The milk powder serves as a diluent to facilitate future drying of the mixture and grinding to small particle size. We have found that other milk constituents or edible diluents may be used if they absorb the free moisture in the tissue or tissue-salt mixture, produce a mixture which can be readily dried and do not adversely affect the esterase activity.

The mixture is then "chopped" in a hammermill with the blades forward to further mix the tissue-salt and milk powder and to break up any agglomerated masses. The mixture is then dried at not more than 110° F. with sufficient circulation of the air to keep the temperatures of all parts of the mixture substantially uniform, the drying being continued until the moisture content of the mixture has been reduced to 7% or less. Although the mixture may be dried at a temperature as high as 110° F., it is preferable to keep the temperature approximately 105° F. The principal result to be achieved in the drying step is to remove as much as possible of the water from the tissue fraction of the mixture, which was originally in the tissue or was absorbed therefrom by the milk powder. The milk powder itself has only approximately 2% water content which cannot be removed at temperatures below 110° F. Under some atmospheric conditions, it is necessary to continue the drying process for as much as 48 hours to obtain a sufficiently dry material, but 24 hours is usually sufficient under average atmospheric conditions.

The dried tissue, salt, milk powder mixture is then pulverized in a hammermill using a 40 mesh screen, to particle sizes approximating those of the milk powder. In the present instance, the particles are substantially all of such size as to pass a 60 mesh screen.

The enzyme content of the pregastric esterase composition is now determined. The pregastric esterase concentration is expressed in pregastric esterase units and is defined by the amount of enzyme activity determined by a standdard test procedure.

The standard conditions of test include: The preparation of an aqueous suspension of enzyme which contains an accurately weighed quantity of enzyme in 100 ml. of distilled water, the incubation of an aliquot of enzyme suspension in buffered B. naphthyl laurate ester solution at 42–44° C. for 20 minutes, followed by inactivation of the enzyme, color development, and spectrophotometric reading of end point.

The result optical density value is converted to a test value using a table computed for the purpose. The test value divided by the weight of preparation in the aqueous suspension gives calf pregastric esterase units per gram:

$$\text{Units CPE/gm.} = \frac{\text{Test value}}{\text{Wt. enzyme preparation in suspension}}$$

This value times 28.35 gives CPE units per ounce.

This value times 454.0 gives CPE units per pound.

As a practical example, calf pregastric tissue is diluted in the proportion of 100 ml. of distilled water for each 0.4 gram of tissue. The aqueous suspension is then tested under the optical density test. Assuming that the material tested at an optical density test value of 30 the material would contain 75 CPE units per gram (30/0.4 gm.=75). We prefer to use a composition which produces a test value in the range of 30–50 (75 CPE units/gm. to 125 CPE units/gm.).

For use in the prevention of scours in herds known to be subject to this syndrome, we administer up to 3750 CPE units (for example 50 grams of 30 test) pregastric esterase composition per day to the calves from first feeding after birth for at least 48 hours. For up to 2 weeks after the birth of the animal, the esterase administered per calf may be increased at the rate of 5–10% up to 11,250 CPE units (150 grams of 30 test material) per day for the average size calf. In cases where prolonged feeding is thought desirable, as soon as a mash (which may contain milk constituents, with or without esterase modification thereof) or dry ground feed is used the pregastric esterase composition may be mixed therewith, although there can be some loss in the quantity of the esterase ingested.

When used as a treatment for animals already suffering from scours, we prefer to administer the pregastric esterase composition in premeasured doses or in bulk by placing it on the tongue of the animal just prior to beginning of feeding where most of it will be immediately swallowed and the remainder, if any, may coat the mouth and throat and be eventually swallowed. The total dosage per day is varied dependent on the age and weight of the animal and is preferably divided into a number of convenient doses. We have found that dosages of 3,750 CPE units can be effective but dosage of 5,200 CPE units per day are very effective under a variety of farm conditions. There is no objection other than higher cost of calf feeding, to much higher dosage up to 20,000 CPE units per day. When the effects of scours are already severe at the time the treatment is started, we mix with the pregastric esterase composition one or more antibiotics and/or vitamins of a kind or kinds and in a quantity dependent on the weight and general condition of the animal and on the conditions under which it is being raised, the kind and dosages of vitamins being determined by rules well known to breeders and veterinarians.

Vitamins such as A, B, or B-complex, D and antibiotics such as penicillin, oxytetracycline, streptomycin may be compounded with or administered with the pregastric esterase composition according to the judgment of competent professional authorities.

In tests using calves of different ages and weights, the following table shows typical conditions of treatment and the results observed.

*Table II*

| Administered | No. of Animals | Ave. CPE per day | Days to Cure |
|---|---|---|---|
| Pregastric esterase only | 27 | 4,700 | 3.5 |
| Pregastric esterase plus oxytetracycline | 42 | 3,560 | 2.2 |

Where some animals were untreated in a test (all animals apparently having deteriorated to the same degree), the untreated animals usually died or became chronic scour cases. Treatments with only vitamins and/or antibiotics failed to shown any consistant curative effects on animals so treated in the above test. The rate of cure of scours in calves treated with the pregastric esterase composition without antibiotic has been approximately 86% of the calves treated regardless of the severity of scours at the beginning of treatment.

At the present time we believe that the free fatty acids and glycerides liberated by pregastric esterase and particularly the high proportion of butyric acid, may each act alone or in combination in a number of ways to secure the effects of preventing and curing scours in calves. The free fatty acids and the mono- and di-glycerides can act as emulsifying agents aiding in suspending nutrients, particularly milk proteins, in a soft curoy state. Such suspensions are less irritating and may be, in fact, soothing to the stomach wall and may bind more fluid than when the milk curds are in large lumps. Hence the curds may be more rapidly digested and more readily absorbed by the calf. Further, the fatty acids and fatty acid salts formed have a buffering effect and may maintain pH of stomach contents at a level more favorable to digestion. The fatty acids may also have the effect of inhibiting certain strains of undesirable bacteria while allowing the more desirable bacteria to multiply and take part in digestion. Substantially larger amounts of butyric acid and butyrates may be present in the digestive tract of calves treated by our method, than is usual in most calves, and may be directly and rapidly absorbed into the blood stream, thereby providing better and faster utilization of that part of the energy derived from the milk fat.

Although several embodiments of the present invention have been illustrated and described, it will be apparent to those skilled in the art that various changes and modifications may be made therein without departing from the spirit of the invention or from the scope of the appended claims.

We claim:

1. The method of preventing and treating the condition known as "scours" in young milk-fed animals, which comprises, administering by mouth a pregastric esterase composition having a predetermined esterase activity level, the esterase being obtained from secretory sites located in the tongue and throat tissue of milk-fed animals, the composition being administered from approximately the time the animal is capable of feeding after birth and continuing for a maximum of six months.

2. The method of preventing and treating the condition known as "scours" in young milk-fed animals, which comprises, administering up to 20,000 pregastric esterase units per day of a pregastric esterase containing composition, said pregastric esterase being obtained from the tongue, oral cavity and throat tissue of milk-fed animals, the composition being administered from approximately the time the animal is capable of feeding and continuing for a maximum of six months.

3. The method of preventing and treating the condition known as "scours" in young milk-fed animals, which comprises, administering by mouth up to 20,000 pregastric esterase units per day of a composition consisting essentially of a pregastric esterase obtained from the tongue and throat tissues of young milk-fed animals mixed with an edible diluent having less than 5% water content, the tissue being added to the diluent in substantially equal proportions, the composition being administered from approximately the time the animal is capable of feeding and continuing for a maximum of six months.

4. The method of preventing and treating the condition known as "scours" in young milk-fed animals, which comprises, administering by mouth from 3,750 to 20,000 pregastric esterase units per day of a composition consisting essentially of an esterase system obtained from the tongue, mouth and throat tissues of young milk-fed animals combined with a dried skim milk powder of 2-5% water content in substantially equal proportions, the composition being administered for a maximum of six months.

5. The method of preventing and treating the condition known as "scours" in young milk-fed animals, which comprises, administering by mouth prior to feeding up to 20,000 pregastric esterase units per day of a pregastric esterase composition taken from tissue of the tongue and glossi-epiglottis and esophagus-pharyngeal throat tissues of young milk-fed animals, the composition being administered from approximately 4 hours after birth and for up to 6 months and at a rate increasing by 5-10% of an initial dosage of 3,750 pregastric esterase units per day up to 20,000 units per day.

6. The method of preventing and treating the condition known as "scours" in young milk-fed animals, which comprises, beginning feedings with a mash at a rate to give a dosage of up to 20,000 pregastric esterase units per day of a standardized pregastric esterase obtained from the tongue and throat tissues of young milk-fed animals from the time the animal is capable of feeding for up to six months, increasing the initial dosage by 5-10% per day as the animal weight increases.

References Cited in the file of this patent

UNITED STATES PATENTS 2,906,621     Catron     Sept. 29, 1959